United States Patent
Kathirvel et al.

(10) Patent No.: US 10,543,930 B2
(45) Date of Patent: Jan. 28, 2020

(54) SYSTEMS AND METHODS FOR PROVIDING AUGMENTED INFORMATION FOR VEHICLE MULTI-FUNCTION DISPLAY ELECTRONICS

(71) Applicant: Honeywell International Inc., Morris Plains, NJ (US)

(72) Inventors: Kannan Kathirvel, Kathirvel (IN); Elsa Mary Sebastian, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/041,104

(22) Filed: Jul. 20, 2018

(65) Prior Publication Data

US 2018/0346143 A1 Dec. 6, 2018

Related U.S. Application Data

(63) Continuation of application No. 15/410,224, filed on Jan. 19, 2017, now Pat. No. 10,053,225.

(51) Int. Cl.
*B64D 43/00* (2006.01)
*G02B 27/01* (2006.01)
(Continued)

(52) U.S. Cl.
CPC .............. *B64D 43/00* (2013.01); *G02B 27/01* (2013.01); *G06T 1/20* (2013.01); *G06T 11/60* (2013.01);
(Continued)

(58) Field of Classification Search
CPC .... G01C 23/00; G08G 5/0034; G08G 5/0043; G08G 5/0047; B64D 43/00; G02B 27/01; G02B 2027/0141
See application file for complete search history.

(56) References Cited

U.S. PATENT DOCUMENTS 8,335,790 B2  12/2012  Sauvalle et al.
8,831,795 B2  9/2014  Cabos
(Continued)

FOREIGN PATENT DOCUMENTS

EP  2 988 286 A1  2/2016

OTHER PUBLICATIONS

European Patent Office, "Extended European Search Reporting for EP Application No. 17184372.5", "Foreign Counterpart to U.S. Appl. No. 15/410,224", dated Feb. 9, 2018, pp. 1-9, Published in: EP.

*Primary Examiner* — Hongmin Fan
(74) *Attorney, Agent, or Firm* — Bookoff McAndrews, PLLC

(57) ABSTRACT

Systems and methods for providing augmented information for vehicle multi-function display electronics are provided. In one a method for providing augmented information for vehicle multi-function display (MFD) electronics comprises: receiving via a downlink communication, a vehicle profile comprising an MFD Profile descriptive of how a pilot is currently utilizing a cockpit MFD; determining whether an MFD map application is displaying information on the cockpit MFD based on the MFD Profile; when the MFD map application is determined to be displaying information on the cockpit MFD: defining a set of potential information enhancements based on the vehicle profile; collecting information corresponding to the set of potential information enhancements from one of more data sources; transmitting an uplink communication comprising an Augmented Map Profile, wherein the Augmented Map Profile comprises the information corresponding to the set of potential information enhancements.

20 Claims, 3 Drawing Sheets

(51) Int. Cl.
  *G06T 11/60*  (2006.01)
  *G06T 1/20*  (2006.01)
  *G06F 3/0482*  (2013.01)

(52) U.S. Cl.
  CPC ........ *G06F 3/0482* (2013.01); *G06T 2200/24* (2013.01)

(56) References Cited

U.S. PATENT DOCUMENTS

| | | | |
|---|---|---|---|
| 8,868,259 B2 | 10/2014 | Srinivasan et al. | |
| 2005/0182530 A1* | 8/2005 | Murphy | G01C 23/00 |
| | | | 701/16 |
| 2013/0204824 A1* | 8/2013 | Barry | G06G 5/00 |
| | | | 706/46 |
| 2015/0277114 A1* | 10/2015 | Westra | B60K 35/00 |
| | | | 345/8 |
| 2016/0161283 A1* | 6/2016 | Shamasundar | G06F 3/0481 |
| | | | 701/3 |

* cited by examiner

US 10,543,930 B2

SYSTEMS AND METHODS FOR PROVIDING AUGMENTED INFORMATION FOR VEHICLE MULTI-FUNCTION DISPLAY ELECTRONICS

CROSS-REFERENCE TO RELATED APPLICATIONS

This Application is a continuation of and claims the benefit of priority to non-provisional U.S. patent application Ser. No. 15/410,224, filed Jan. 19, 2017, which claims priority to, and benefit of Indian Provisional Patent Application No. 201641028128, entitled "SYSTEM AND METHOD FOR A NEXT GENERATION MULTI-FUNCTION DISPLAY WITHIN A CONNECTED AIRCRAFT PLATFORM" and filed on Aug. 18, 2016, which is incorporated herein by reference in its entirety.

BACKGROUND

A typical multi-function display (MFD) in an aircraft cockpit utilizes information from different avionic sub-systems and on-board databases to provide multitude of information to the pilot with respect to effective navigation of the flight. The Multi-Function Display (MFD) can be any display (an Electronic Flight Bag or Heads-Up Display or Tablet) in the cockpit which combines information from different avionic sub-systems and generates graphics symbology in-turn providing more efficient situational awareness to the pilot. In order to provide a relevant information, the on-board MFD hosts a variety and multitude of different onboard databases each specific to a graphic function for driving MFD map application layers. Availability of these databases determine the ability of the MFD to generate specific graphic functions and considering the order of growth of these databases, creates an inherent limitation on the MFD in expanding the new graphics functionalities. However, the cost of expanding the avionic platforms in terms of computation and storage capabilities can rival the value of new functions that drives the avionic upgrade. With ever expanding weather collection and correlations, more detailed weather forecasts are evolving at a faster pace and avionic certification expenses impend these features deployment to airplanes. For the reasons stated above and for other reasons stated below which will become apparent to those skilled in the art upon reading and understanding the specification, there is a need in the art for system and methods for a next generation multi-function display within a aircraft platform which has a connectivity with ground systems.

SUMMARY

The Embodiments of the present disclosure provide methods and systems for Providing Augmented Information for Vehicle Multi-Function Display Electronics and will be understood by reading and studying the following specification.

In one embodiment a method for providing augmented information for vehicle multi-function display (MFD) electronics comprises: receiving via a downlink communication, a vehicle profile comprising an MFD Profile descriptive of how a pilot is currently utilizing a cockpit MFD; determining whether an MFD map application is displaying information on the cockpit MFD based on the MFD Profile; when the MFD map application is determined to be displaying information on the cockpit MFD: defining a set of potential information enhancements based on the vehicle profile; collecting information corresponding to the set of potential information enhancements from one of more data sources; transmitting an uplink communication comprising an Augmented Map Profile, wherein the Augmented Map Profile comprises the information corresponding to the set of potential information enhancements.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

Figure 1:
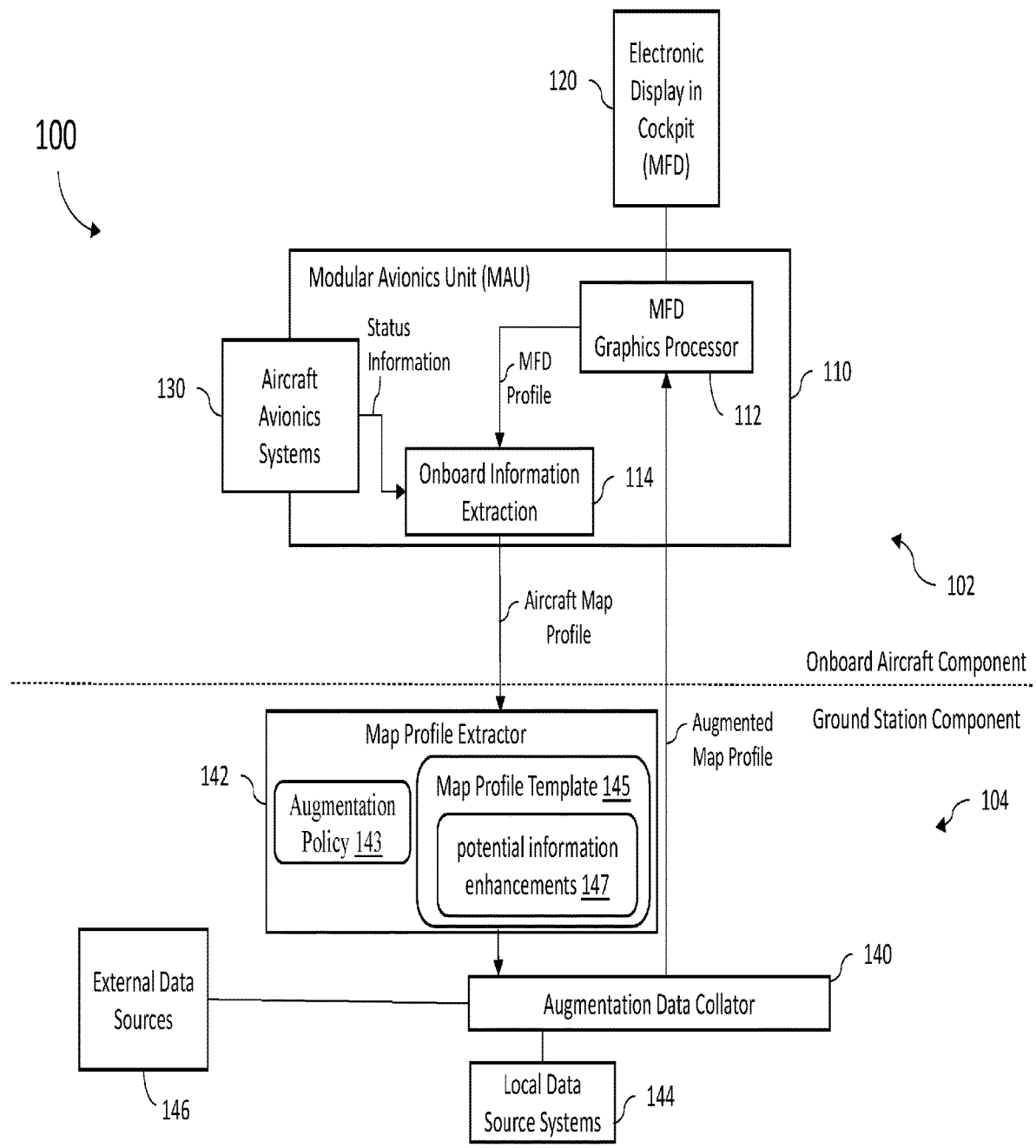
FIG. 1 is a block diagram illustrating a cockpit MFD augmentation system of one embodiment of the present disclosure.

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiment of the present disclosure address the problem of providing real-time augmented information to a cockpit multi-function display (MFD) system while avoiding the need for a pilot to specifically initiate requests for such information, avoiding the need to maintain large on-board databases, and while avoiding the need to routinely communicate potentially non-relevant data between ground systems and in-flight aircraft.

More specifically, the present disclosure presents embodiments of systems and methods that decipher how the pilot and/or co-pilot are currently utilizing a cockpit multi-function display (MFD). Based on how map application functions are being used, and what a pilot has selected for display on the MFD, on-board avionics creates an MFD profile. The MFD profile may optionally be combined with other aircraft status information compiled from other aircraft avionics systems (such as aircraft position, altitude, ground speed, air speed, In-Air/On-Ground flags, different display status (what's displayed in which display), aircraft heading, autopilot status, or flight phase, for example) and transmitted down to a ground station as an aircraft profile. This downlinked aircraft profile is evaluated by ground systems to ascertain what information might be appropriate to augment information already being viewed by the pilot on the aircraft. Factors which may be considered in determining appropriate augmentation information may include, but are not limited to, which map application (if any) is being executed by the on-board MFD, what geographic location is being viewed and what range the pilot has selected to appear on the screen. For example, a pilot viewing a map centered on the Phoenix, Ariz. area may be given a first set of augmentation information if the MFD is set to view a 50 square mile range, and a second set of augmentation information if the MFD is set to view a 500 square mile range. Moreover, what is appropriate augmentation information may further be a function of data provided in the aircraft status information.

For example, a pilot viewing a map centered on a given area at a 50 square mile range may be given a first set of augmentation information when the aircraft is positioned within a certain distance from the region being viewed, and a second set of augmentation information when the aircraft is positioned more than a certain distance from the region being viewed. That is, an MFD presenting a map of the Phoenix, Ariz. area with a 50 square mile range displayed may be given a first set of augmentation information when the aircraft is near the Phoenix, Ariz. area, but provided a different set of augmentation information while the aircraft is flying near Minneapolis, Minn. Further, the augmentation information may differ if the aircraft is in a flight stage of its flight plan where it is simply passing through the Phoenix, Ariz. area as opposed to a flight stage where the flight plan calls for the aircraft to descend and land in the Minneapolis, Minn. area.

Once an appropriate set of augmentation information is extracted from the downlinked aircraft profile, electronic systems at a ground station may collect and collate the information from a multitude of local and external databases which may be either proprietary or public information sources. An augmented map profile containing the augmentation information is then uplinked to the on-board aircraft avionics which process the information for display on the MFD. During this entire process, the pilot may continue to concentrate on operating the aircraft and monitoring its position on the MFD. The pilot is supplied with the benefit of having the augmented information displayed on the MFD without the need to make specific additional requests for the information.

Although the example embodiments presented herein use aircraft as examples of vehicles that may embody and utilize these embodiments, it should be understood that the scope of the present disclosure is not so limited, but may include other vehicle. It should also be understood that the term "pilot" is used herein in a generic sense as referring to any operator of the vehicle or user of the on-board MFD. For example, in the specific case of an aircraft, "pilot" may refer to any member of the aircraft flight crew unless specific reference is being made to the pilot's station vs the co-pilot's station in the cockpit of the vehicle.

FIG. 1 is a block diagram illustrating a cockpit MFD augmentation system 100 of one embodiment of the present disclosure. As illustrated in FIG. 1, system 100 includes an on-board aircraft component 102 which communicates while in-flight with a ground station component 104. Bi-directional communications between the on-board aircraft component 102 and the ground station component 104 may be achieved using any combination of aircraft-ground datalinks and satellite communications know to those in the aviation industry using standard on-board and ground based communications electronics, amplifiers and transceivers as are known to those of skill in the art of aviation. Communications can also happen through any cellular or wireless networks between on-board aircraft component 102 and ground station component 104. Communications that send information from the aircraft component 102 to the ground station component 104 may be referred to herein as downlinks while communications that send information from the ground station component 104 to the aircraft component 102 may be referred to herein as uplinks. It should also be understood that the elements and functions described herein with respect to the ground station component 104 may be performed at a single physical facility, or distributed over several facilities at different locations.

Aircraft component 102 of system 100 comprises an Integrated Modular Avionics (IMA) 110 which may also be referred to herein and in the industry as a Modular Avionics Unit (MAU) 110. The IMA 110 is coupled to a cockpit Multi-Function Display (MFD) 120.

As the term is used herein, the cockpit Multi-Function Display 120 comprises an avionics hardware device that combines navigation systems and situational awareness information (such as weather or airspace traffic, for example) onto one or more electronic displays in the aircraft's cockpit. The cockpit MFD 120 combines an integrated display and control interface for a number of different functions and presents information received from a variety of advanced avionics systems. In some applications executed by MFD 120 the pilot can overlay different information over a map or chart displayed on a screen of the MFD 120. Examples of such information may include, but are not limited to, the aircraft's current route plan, weather information from either on-board or ground-based sensors. In non-map applications, the MFD 120 can also display information about aircraft systems, such as fuel, engines, breaks, and electrical systems. In some embodiments, cockpit MFD 120 may include a single screen for displaying information. In other embodiments, cockpit MFD 120 may include multiple screen and may comprise a dedicated screen and input interface at the aircraft's pilot station and a separate dedicated screen and input interface at the co-pilot station. The MFD 120 also encompass Electronic Flight Bags (EFB) or any portable Tablet hardware which is used in the cockpit.

The IMA 110 comprises one or more networked avionic computer systems which may implement functions for one or more of: the aircraft's flight control system, flight management system, fuel system, environment control system, communications management, electronic display system, engine indications, flight crew alert and warning systems, and maintenance computer. In some embodiments, such systems or functional modules comprised within the IMA 110 may be implemented by their own complement of processors, memories, and/or databases, and applications resident in the memories which when executed on the processor implement the specific functions. In alternate implementations, processing related hardware may be shared across the different systems implemented by the IMA 110.

In the embodiment shown in FIG. 1, the IMA 110 includes sub-systems which include an MFD Graphics Processor 112 and an Onboard Information Extraction Sub-system 114. The MFD Graphics Processor 112 may host and execute the processes generating the MFD graphics displayed by the MFD 120. The Onboard Information Extraction Sub-system 114 communicates with the MFD Graphics Processor 112 to extract the information necessary to build an MFD Profile descriptive of how a pilot is currently utilizing the cockpit MFD (as described above). In addition to which map application is being executed what geographic location is being viewed and what range the pilot has selected to appear on the MFD 120, the MFD Profile may describe one or more of the Map Orientation and what terrain & Geographic Layers are currently applied. The Onboard Information Extraction Sub-system 114 may optionally further communicates with other aircraft avionics systems (shown at 130, which may be either internal or external to the IMA 110) to compile other aircraft status information, such as but not limited to aircraft position or flight phase, for example. The other aircraft status information may also include tactical information such as, but not limited to, current fuel reserves, break conditions, and engine operating statistics. The MFD Profile, either by itself or combined with the optional aircraft status information, is transmitted to the ground station component in a downlink communication as an aircraft profile.

Ground station component 104 of system 100 comprises an augmentation data collator 140 and a Map Profile Extractor 142. Such systems or functional modules comprised within the ground station component 104 may be implemented by their own complement of processors, memories, and/or databases, and applications resident in the memories which when executed on the processor implement the specific functions. In alternate implementations, processing related hardware may be shared across the different systems and modules implemented by the ground station component 104. As shown in FIG. 1, data collator 140 may be communicatively coupled to one or more local data sources 144 and external data sources 146. Local data sources 144 may comprise, for example, databanks or databases directly maintained by the operator of the ground station components 104. External data sources 146 may comprise, for example, databanks or databases from third-party sources which may provide public domain and/or proprietary information either freely or on fee basis (such as through a subscription service, for example).

The downlinked aircraft profile is evaluated by the Map Profile Extractor 142 to ascertain what information should be obtained by the augmentation data collator 140 to augment information already being visualized to the pilot by the MFD 120. In one embodiment, the Map Profile Extractor 142 extracts from the MFD Profile which, if any MFD map application function is activated on the MFD 120. When a MFD map application function is activated, the Map Profile Extractor 142 further extracts which screen of MFD 120 is being used with the activated MFD map application function, the geographic region being viewed, and the range of the view being displayed. In some implementations, the extracted information may also include whether the pilot MFD screen, co-pilot MFD screen, or both, or any electronic display in the cockpit are using map function and if so, then the extracted MFD profile information would indicate what location and range is being viewed on each of the MFD display screens.

As a function of this extracted information and an Augmentation Policy 143 (which may from a stored data file), the Map Profile Extractor 142 builds a Map Profile Template 145 that defines a set of potential information enhancements 147 that are likely to provide useful and relevant information to augment information already being viewed by the pilot on the MFD 120. In on embodiment, the Augmentation Policy defines rules that set forth what combination of potential information enhancements are likely to be relevant given an existing state of the aircraft and MFD as indicated in the aircraft profile. In one embodiment, if the MFD Profile downlink communication shows that no map application is currently executing and/or generating a display in the cockpit, then the Map Profile Template may be empty because there would be no need to provide augmented information back to the aircraft. It should be noted that the set of potential information enhancements 147 may include information not just pertaining to what is in the pilots immediate range of view on the MFD 120 screen, but may include different sets of information that are available at different ranges.

The data collator 140 inputs the Map Profile Template and attempts to collect what is information is available from either its own database or from the local data sources 144 or the external data sources 146 to populate the Map Profile Template 145 with data corresponding to the set of potential information enhancements 147 identified by the Map Profile Extractor 142. In one embodiment, data collator 140 transmits requests or queries to the data sources 144, 146 to initiate collection of augmentation information.

Between the local data sources 144 and external data sources 146, these information sources may provide live and dynamic or databased information as indicated (but not limited to) in Table 1.

TABLE 1.0

Augmentation Information Sources

| Information Source | Nature of Information | Information Use for Flight |
|---|---|---|
| Traffic congestion and Airspace Clearance Quality | Live and Dynamic | Indicates flow of traffic in the specified airspace where the airplane is expected per the Map Profile. Unexpected weather factors prevailing in the airspace which influence the Traffic congestion in the airspace and along the flight plan field by the ownship. This information helps in modifying the Map Profile such that ownship able to navigate in a more efficient route. |
| Weather Information | Live and Dynamic | Weather information from multiple sources which gives complete visualization on the prevailing atmospheric condition and its influence in the flight progression along the flight plan. Weather information includes wind speed, precipitation, temperature and pressure fluctuations, lightning conditions, turbulence and microburst conditions. |
| Airport Moving Map | Database | Presents high resolution details on the Airport features which includes Runways, Taxiways, Terminal Areas, Aprons and etcetera. For the Take-off, Approach, Taxi-out and Taxi-In phase of the flight, high resolution Airport image helps the pilot to get enhanced situational awareness for surface operations. Taxi Routing and Surface Traffic Indication/Alerts functions are performed over the Airport layer in the MFD. |

TABLE 1.0-continued

Augmentation Information Sources

| Information Source | Nature of Information | Information Use for Flight |
|---|---|---|
| Terrain | Database | High resolution information on the underlying geographic terrain elevation. Helps the pilot to derive a visual clue on the terrain topography underneath the airplane. Information is highly useful in across different phase of the flight. |
| Geo-political, Roadways, Railways, Heliports and Navigation DBs | Database | Presents the geographic partitioning of the terrain with respect to the context of political and/or airspace reasons. Useful in the cruise and approach phase of the flight aiding pilot in tuning to different airspace navigation frequencies. |

With the Map Profile Template populated with the augmentation information, the data collator 140 then transmits this collected information in an uplink communication to the aircraft as an Augmented Map Profile. Back on-board the aircraft, the MFD Graphics Processor 110 inputs the Augmented Map Profile and stores it to memory, and generates graphical representations of the augmentation information to overlay onto the screen that are relevant given the map location and range currently being viewed on the MFD 120. Appropriate symbologies will be created as per the nature of the information. As the information on the MFD 120 map updates either due to aircraft travel or pilot action, the process is repeated in real-time.

As such, when an aircraft is still on-ground at an airport preparing for takeoff, as soon as the flight plan is loaded into the flight management system, the MFD 110 and or MFD Graphics Processor 110 receives all the needed baseline data to present the pilot with maps anywhere along the planned flight path. The map applications may provide, for example, a tactical map comprising a two-dimensional map providing a view down onto the terrain anywhere along the loaded flight plan path. Another map mode that may be provided, for example, is a Vertical Structural Display (VSD) that provides a vertical profile of the terrain anywhere along the loaded flight plan path. Once in flight, data to augment the baseline data is uploaded automatically based on how the pilots are operating the MFD 120 as described above. Should the aircraft travel into a region where communications are poor, then additional augmentation information may not be available until communications are restored, but the baseline information loaded at the airport is still available. System 100 will be able to augment information from multiple sources and generate a holistic information set catering the immediate need to the current phase of the flight of the aircraft. With this approach, onboard resource constraints and information availability will not impact the presentation of enhanced graphics content. By decoupling the onboard hardware and resource requirements, embodiments provided here allow an MFD supplier to offer enhanced graphics content as a "Service" and able to introduce a "Subscription" based pricing model.

Figure 2:
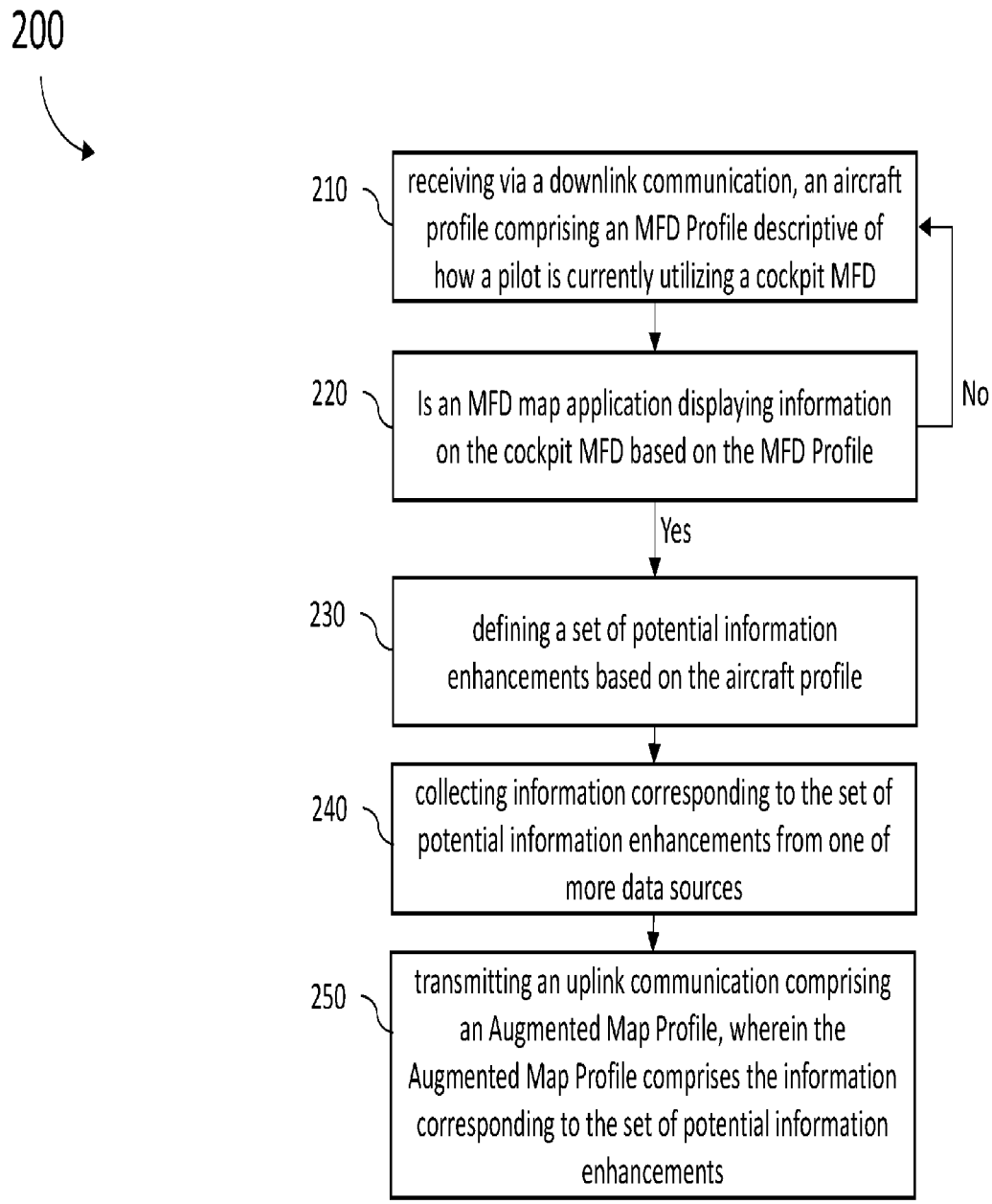
FIG. 2 is a flow chart illustrating a method of one embodiment of the present disclosure.

FIG. 2 is a diagram illustrating a method 200 of one embodiment of the present disclosure for providing augmented information for aircraft multi-function display avionics. It should be understood that method 200 may be implemented in conjunction with any of the various embodiments and implementations described in this disclosure above or below. As such, elements of method 200 may be used in conjunction with, in combination with, or substituted for elements of those embodiments. Further, the functions, structures and other description of elements for such embodiments described herein may apply to like named elements of method 200 and vice versa.

The process begin at 210 with receiving via a downlink communication, an aircraft profile comprising an MFD Profile descriptive of how a pilot is currently utilizing a cockpit MFD. The MFD Profile may include which map application is being executed, what geographic location is being viewed, and what range the pilot has selected to appear on the MFD. The MFD Profile may further describe one or more of the Map Orientation and what terrain & Geographic Layers are currently applied. In one embodiment, an Onboard Information Extraction Sub-system communicates with an MFD Graphics Processor to extract the information necessary to build the MFD Profile. In one embodiment, the MFD profile may optionally be combined with other aircraft status information compiled from other aircraft avionics systems (such as aircraft position, altitude, ground speed, air speed, In-Air/On-Ground flags, aircraft heading, autopilot status, or flight phase, for example) and transmitted down to a ground station as the aircraft profile. The MFD Profile, either by itself or combined with the optional aircraft status information, is transmitted to the ground station component in a downlink communication as the aircraft profile.

The method proceeds to 220 with determining whether an MFD map application is displaying information on the cockpit MFD based on the MFD Profile. If not, the method returns to 210. When the method at 220 determines that an MFD map application is displaying information on the cockpit MFD based on the MFD Profile, the method proceeds to 230. At 230, the method proceeds with defining a set of potential information enhancements based on the aircraft profile. The set of potential information enhancements defined at 230 represents likely useful and relevant information to augment information already being viewed by the pilot on the MFD. In one embodiment, as a function of the extracted information from the aircraft profile and an Augmentation Policy (which may from a stored data file), the method at 230 builds a Map Profile Template that comprises the set of potential information enhancements.

The method proceeds to 240 collecting information corresponding to the set of potential information enhancements from one of more data sources. In one embodiment, the method 200 at 240 attempts to collect what information is available from either local data sources or the external data sources. In one embodiment, the collected information is populated into the Map Profile Template. The method then proceeds to 250 with transmitting an uplink communication comprising an Augmented Map Profile, wherein the Augmented Map Profile comprises the information corresponding to the set of potential information enhancements. In one embodiment, with the Map Profile Template populated with the augmentation information, the method at 240 transmits the collected information in an uplink communication to the aircraft as an Augmented Map Profile. Back on-board the aircraft, the MFD Graphics Processor may input the Augmented Map Profile (and optionally store it to memory) and generate graphical representations of the augmentation information that are relevant given the map location and range currently being viewed on the cockpit MFD.

Figure 3:
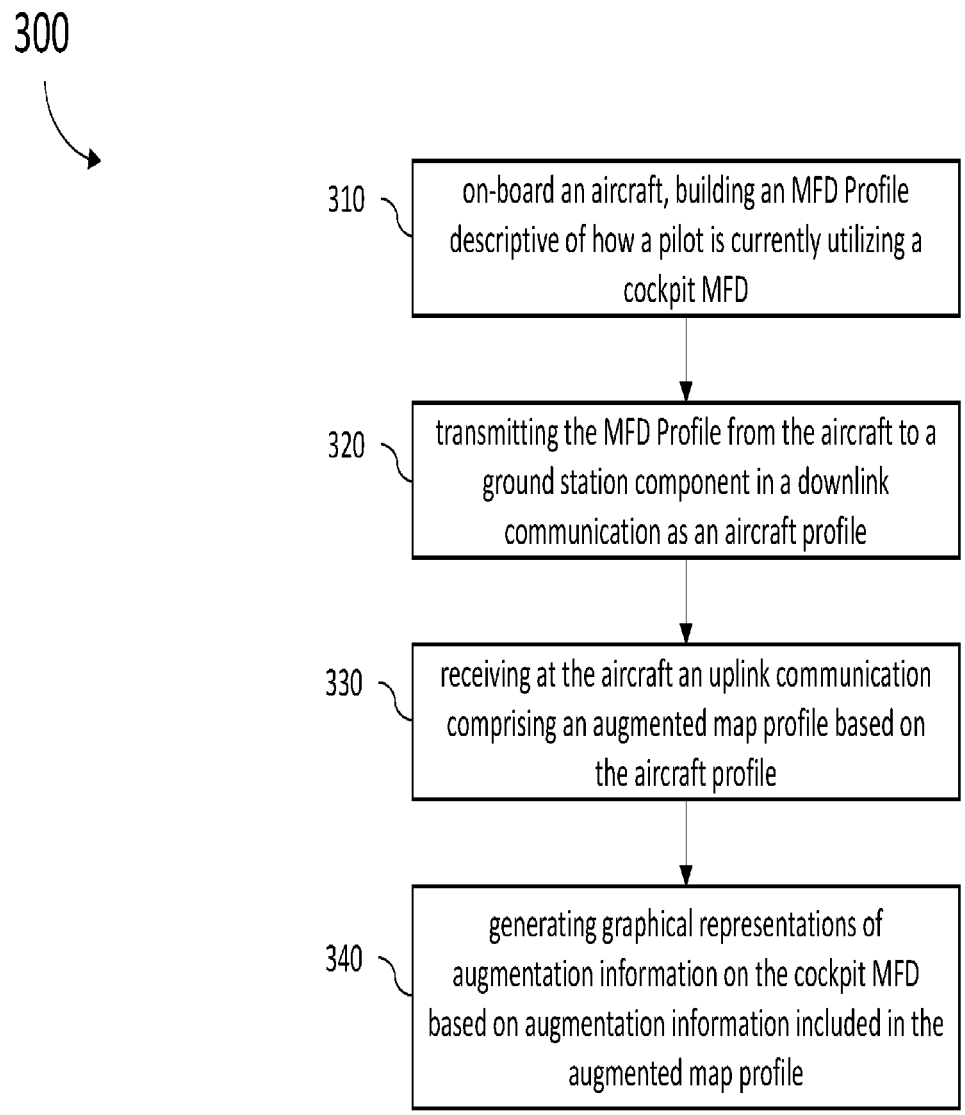
FIG. 3 is a flow chart illustrating a method of one embodiment of the present disclosure.

FIG. 3 is a diagram illustrating a method 300 of one embodiment of the present disclosure for providing augmented information for aircraft multi-function display avionics. Method 300 is complementary to method 200 in that it describes the on-board process that interfaces with the ground station process described in method 200. It should be understood that method 300 may be implemented in conjunction with any of the various embodiments and implementations described in this disclosure above or below. As such, elements of method 300 may be used in conjunction with, in combination with, or substituted for elements of those embodiments. Further, the functions, structures and other description of elements for such embodiments described herein may apply to like named elements of method 300 and vice versa.

The method begins at 300 with building an MFD Profile descriptive of how a pilot is currently utilizing the cockpit MFD. In one embodiment, an Onboard Information Extraction Sub-system communicates with an MFD Graphics Processor to extract the information necessary to build an MFD Profile descriptive of how a pilot is currently utilizing the cockpit MFD. In addition to which map application is being executed what geographic location is being viewed and what range the pilot has selected to appear on the cockpit MFD, the MFD Profile may describe one or more of the Map Orientation and what terrain & Geographic Layers are currently applied. Method 300 at 310 may optionally further comprise communication with other aircraft avionics systems to compile other aircraft status information, such as but not limited to aircraft position or flight phase, for example. The other aircraft status information may also include tactical information such as, but not limited to, current fuel reserves, break conditions, and engine operating statistics. The method then proceeds to 320 where the MFD Profile, either by itself or combined with the optional aircraft status information, is transmitted to the ground station component in a downlink communication as an aircraft profile. Once the ground station component processes the aircraft profile into an augmented map profile (which may, in one embodiment, be accomplished as described by method 200), the method proceed to 330 with receiving an uplink communication comprising an augmented map profile based on the aircraft profile. The method proceeds to 340 with generating graphical representations of augmentation information on the MFD based on augmentation information included in the augmented map profile.

Example Embodiments

Example 1 includes a cockpit multi-function display (MFD) augmentation system, the system comprising: an onboard vehicle component comprising: an MFD Graphics Processor coupled to a cockpit MFD and an Onboard Information Extraction Sub-system, wherein MFD Graphics Processor generates MFD graphics displayed by the cockpit MFD; wherein the Onboard Information Extraction Sub-system communicates with the MFD Graphics Processor to extract information to build an MFD Profile descriptive of how the cockpit MFD is currently being utilized; wherein the onboard vehicle component transmits the MFD Profile in a downlink communication as a vehicle profile; a ground station component comprising: a Map Profile Extractor that receives and evaluates the vehicle profile and generates a set of potential information enhancements based on the vehicle profile; and an augmentation data collator in communication with at least one augmentation information data source, wherein the augmentation data collator retrieves from the at least one augmentation information data source data corresponding to the set of potential information enhancements, and generates augmentation information based on the data corresponding to the set of potential information enhancements; and wherein the onboard vehicle component transmits the augmentation information in an uplink communication to the onboard vehicle component as an Augmented Map Profile; wherein the MFD Graphics Processor inputs the Augmented Map Profile and generates graphical representations of the augmentation information on the cockpit MFD.

Example 2 includes the system of example 1, wherein the MFD Profile includes information indicating what map application is being executed, what geographic location is being viewed on the cockpit MFD, and what range is selected to appear on the cockpit MFD.

Example 3 includes the system of example 2, wherein the Onboard Information Extraction Sub-system is further coupled to one or more aircraft avionics systems and collects aircraft status information from the one or more aircraft avionics systems; and wherein the Onboard Information Extraction Sub-system combines the aircraft status information with the MFD Profile in to generate the vehicle profile.

Example 4 includes the system of example 3, wherein the one or more aircraft avionics systems includes at least one of a flight control system, a flight management system, a communications management, an electronic display system, an engine indication system, flight crew alert and warning systems, and a maintenance computer.

Example 5 includes the system of any of examples 3-4, wherein the aircraft status information includes at least one of aircraft position, altitude, ground speed, air speed, In-Air/On-Ground flags, aircraft heading, autopilot status, or flight phase.

Example 6 includes the system of any of examples 1-5, wherein the Map Profile Extractor builds a Map Profile Template that defines the set of potential information enhancements as a function of information extracted from the vehicle profile and an Augmentation Policy.

Example 7 includes the system of example 6, wherein the Augmentation Policy defines rules that set forth what combination of potential information enhancements are likely to be relevant given an existing state of a vehicle and the cockpit MFD as indicated in the vehicle profile.

Example 8 includes the system of any of examples 6-7, wherein the augmentation data collator populates the Map Profile Template with collected augmentation information to generate the augmented map profile.

Example 9 includes the system of any of examples 1-8, wherein the at least one augmentation information data source includes one or both of: at least one data source external to the ground station component; and at least one data source local to the ground station component.

Example 10 includes the system of any of examples 1-9, where the MFD Graphics Processor coupled to a cockpit MFD and the Onboard Information Extraction Sub-system are comprised within and Integrated Modular Avionics system.

Example 11 includes a method for providing augmented information for vehicle multi-function display (MFD) electronics, the method comprising: receiving via a downlink communication, a vehicle profile comprising an MFD Profile descriptive of how a pilot is currently utilizing a cockpit MFD; determining whether an MFD map application is displaying information on the cockpit MFD based on the MFD Profile; when the MFD map application is determined to be displaying information on the cockpit MFD: defining a set of potential information enhancements based on the vehicle profile; collecting information corresponding to the set of potential information enhancements from one of more data sources; transmitting an uplink communication comprising an Augmented Map Profile, wherein the Augmented Map Profile comprises the information corresponding to the set of potential information enhancements.

Example 12 includes the method of example 11, wherein when the MFD map application is determined not to be displaying information on the cockpit MFD, no Augmented Map Profile is transmitted.

Example 13 includes the method of any of examples 11, wherein the MFD Profile includes information describing at least at least what map application is being executed, what geographic location is being viewed on the cockpit MFD and what range is selected to appear on the cockpit MFD.

Example 14 includes the method of any of examples 11-13, wherein the vehicle profile further comprises aircraft status information compiled from aircraft avionics systems that includes at least one of a flight control system, a flight management system, a communications management, an electronic display system, an engine indication system, flight crew alert and warning systems, and a maintenance computer.

Example 15 includes the method of example 14, wherein the aircraft status information includes at least one of: aircraft position, altitude, ground speed, air speed, In-Air/ On-Ground flags, aircraft heading, autopilot status, or flight phase.

Example 16 includes the method of any of examples 11-15, wherein defining a set of potential information enhancements based on the vehicle profile further comprises: building a Map Profile Template that defines the set of potential information enhancements as a function of information extracted from the vehicle profile and an Augmentation Policy.

Example 17 includes the method of any of examples 11-16, wherein collecting information corresponding to the set of potential information enhancements from one of more data sources further comprises: populating the Map Profile Template with collected augmentation information to generate the augmented map profile.

Example 18 includes a method for providing augmented information for vehicle multi-function display (MFD) electronics, the method comprising: on-board a vehicle, building an MFD Profile descriptive of how a pilot is currently utilizing a cockpit MFD; transmitting the MFD Profile from the vehicle to a ground station component in a downlink communication as a vehicle profile; receiving at the vehicle an uplink communication comprising an augmented map profile based on the vehicle profile; generating graphical representations of augmentation information on the cockpit MFD based on augmentation information included in the augmented map profile.

Example 19 includes the method of example 18, wherein the MFP Profile includes information indicating what map application is being executed, what geographic location is being viewed on the cockpit MFD, and what range is selected to appear on the cockpit MFD.

Example 20 includes the method of any of examples 18-19, further comprising: collecting aircraft status information from one or more aircraft avionics systems; and combining the aircraft status information with the MFD Profile in to generate the aircraft profile.

In various alternative embodiments, system elements, method steps, or examples described throughout this disclosure (such as the Onboard Vehicle/Aircraft Component, MFD, Integrated Modular Avionics, Onboard Information Extraction Sub-system, MFD Graphics Processor, Ground Station Component, Map Profile Extractor, Data Collator, and/or sub-parts or any thereof, for example) may be implemented using one or more computer systems, field programmable gate arrays (FPGAs), or similar devices and/or comprising a processor coupled to a memory and executing code to realize those elements, processes, steps or examples, said code stored on a non-transient data storage device. The component may also include SoC (System on Chip) with different Graphics, Computing and Memory elements in single processing silicon. Therefore other embodiments of the present disclosure may include elements comprising program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for providing augmented information for vehicle multi-function display (MFD) electronics, the method comprising:
   receiving, from an on-board vehicle processor in a downlink communication, an MFD profile describing current pilot use of a cockpit MFD;
   analyzing the MFD profile received from the on-board vehicle processor at a ground station component;
   determining whether an MFD map application is displaying information on the cockpit MFD based on the MFD profile received from the on-board vehicle processor at the ground station component in the downlink communication;

defining a set of potential information enhancements from one or more data sources based on the MFD map application being determined to be displaying information on the cockpit MFD; and transmitting an uplink communication to the on-board vehicle processor, the uplink communication comprising an augmented map profile comprising information corresponding to the set of potential information enhancements.

2. The method of claim 1, wherein when the MFD map application is determined not to be displaying information on the cockpit MFD, no augmented map profile is transmitted.

3. The method of claim 1, further comprising receiving at the vehicle via the uplink communication, the augmented map profile.

4. The method of claim 3, further comprising generating graphical representations of augmentation information on the cockpit MFD based on augmentation information included in the augmented map profile.

5. The method of claim 1, wherein the MFD profile includes information describing at least what map application is being executed, what geographic location is being viewed on the cockpit MFD, and what range is selected to appear on the cockpit MFD.

6. The method of claim 1, wherein the vehicle profile further comprises aircraft status information compiled from aircraft avionics systems that includes at least one of a flight control system, a flight management system, a communications management, an electronic display system, an engine indication system, flight crew alert and warning systems, and a maintenance computer.

7. The method of claim 6, wherein the aircraft status information includes at least one of: aircraft position, altitude, ground speed, air speed, in-air/on-ground flags, aircraft heading, autopilot status, or flight phase.

8. The method of claim 1, wherein defining a set of potential information enhancements based on the vehicle profile further comprises:

building a map profile template that defines the set of potential information enhancements as a function of information extracted from the vehicle profile and an augmented policy.

9. The method of claim 8, wherein collecting information corresponding to the set of potential information enhancements from one or more data sources further comprises:

populating the map profile template with collected augmentation information to generate the augmented map profile.

10. A method for providing augmented information for vehicle multi-function display (MFD) electronics, the method comprising:

receiving via a downlink communication, a vehicle profile comprising an MFD profile descriptive of how a pilot is currently utilizing a cockpit MFD;

determining whether an MFD map application is displaying information on the cockpit MFD based on the MFD profile; and when the MFD map application is determined to be displaying information on the cockpit MFD:

defining a set of potential information enhancements based on the vehicle profile;

collecting information corresponding to the set of potential information enhancements from one or more data sources; and transmitting an uplink communication comprising an augmented map profile, wherein the augmented map profile comprises information corresponding to the set of potential information enhancements.

11. The method of claim 10, wherein when the MFD map application is determined not to be displaying information on the cockpit MFD, no augmented map profile is transmitted.

12. The method of claim 10, wherein the MFD profile includes information describing at least at least what map application is being executed, what geographic location is being viewed on the cockpit MFD and what range is selected to appear on the cockpit MFD.

13. The method of claim 10, wherein the vehicle profile further comprises aircraft status information compiled from aircraft avionics systems that includes at least one of a flight control system, a flight management system, a communications management, an electronic display system, an engine indication system, flight crew alert and warning systems, and a maintenance computer.

14. The method of claim 13, wherein the aircraft status information includes at least one of: aircraft position, altitude, ground speed, air speed, in-air/on-ground flags, aircraft heading, autopilot status, or flight phase.

15. The method of claim 10, wherein defining a set of potential information enhancements based on the vehicle profile further comprises:

building a map profile template that defines the set of potential information enhancements as a function of information extracted from the vehicle profile and an augmentation policy.

16. The method of claim 15, wherein collecting information corresponding to the set of potential information enhancements from one or more data sources further comprises:

populating the map profile template with collected augmentation information to generate the augmented map profile.

17. A method for providing augmented information for vehicle multi-function display (MFD) electronics, the method comprising:

on-board a vehicle, building an MFD profile descriptive of how a pilot is currently utilizing a cockpit MFD;

transmitting the MFD profile from the vehicle to a ground station component in a downlink communication as a vehicle profile;

receiving at the vehicle an uplink communication comprising an augmented map profile based on the vehicle profile; and generating graphical representations of augmentation information on the cockpit MFD based on augmentation information included in the augmented map profile.

18. The method of claim 17, wherein the MFP profile includes information indicating what map application is being executed, what geographic location is being viewed on the cockpit MFD, and what range is selected to appear on the cockpit MFD.

19. The method of claim 17, further comprising:

collecting aircraft status information from one or more aircraft avionics systems; and combining the aircraft status information with the MFD Profile in to generate the vehicle profile.

20. The method of claim 19, wherein the aircraft status information includes at least one of: aircraft position, flight phase, current fuel reserves, break conditions, and engine operating statistics.

* * * * *